United States Patent
Zhou et al.

(10) Patent No.: US 10,261,906 B2
(45) Date of Patent: Apr. 16, 2019

(54) DATA ACCESSING METHOD AND APPARATUS

(71) Applicant: HUAWEI TECHNOLOGIES CO., LTD., Shenzhen, Guangdong (CN)

(72) Inventors: Jianhua Zhou, Chengdu (CN); Yan Li, Chengdu (CN); Po Zhang, Chengdu (CN); Fei Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/630,105

(22) Filed: Jun. 22, 2017

(65) Prior Publication Data

US 2017/0286306 A1    Oct. 5, 2017

Related U.S. Application Data

(63) Continuation of application No. PCT/CN2015/097586, filed on Dec. 16, 2015.

(30) Foreign Application Priority Data

Dec. 24, 2014    (CN) .......................... 2014 1 0817949

(51) Int. Cl.
  *G06F 12/08*   (2016.01)
  *G06F 12/0862*   (2016.01)
  (Continued)

(52) U.S. Cl.
  CPC ............ *G06F 12/0862* (2013.01); *G06F 3/06* (2013.01); *G06F 12/0238* (2013.01);
  (Continued)

(58) Field of Classification Search
  CPC .. G06F 12/0862; G06F 3/06; G06F 2212/251; G06F 2212/602
  (Continued)

(56) References Cited

U.S. PATENT DOCUMENTS 5,359,569 A    10/1994   Fujita et al.
7,904,640 B2    3/2011   Yano et al.
(Continued)

FOREIGN PATENT DOCUMENTS

CN        102591807 A    7/2012
CN        103777905 A    5/2014
(Continued)

*Primary Examiner* — Hua J Song
(74) *Attorney, Agent, or Firm* — Huawei Technologies Co., Ltd.

(57) ABSTRACT

A data accessing method includes: determining whether a preset cache area has cached data that a read target address points to when receiving a read instruction that includes the read target address; and finding a cache address corresponding to the read target address according to a first mapping relationship if the preset cache area has cached the data that the read target address points to, and reading data that the cache address points to from the preset cache area, where the first mapping relationship is used to record a correspondence between the target address and the cache address; orreading, from non-volatile storage space, the data that the read target address points to if the preset cache area has not cached the data that the read target address points to. By means of the method, data read errors caused by write interference can be reduced.

12 Claims, 5 Drawing Sheets

(51) Int. Cl.
*G06F 3/06* (2006.01)
*G06F 12/02* (2006.01)

(52) U.S. Cl.
CPC ........... *G06F 2212/1032* (2013.01); *G06F 2212/251* (2013.01); *G06F 2212/602* (2013.01)

(58) Field of Classification Search
USPC ....................................................... 711/118
See application file for complete search history.

(56) References Cited

U.S. PATENT DOCUMENTS

| | | |
|---|---|---|
| 2004/0008561 A1 | 1/2004 | Lee et al. |
| 2006/0259718 A1 | 11/2006 | Paley |
| 2007/0014163 A1 | 1/2007 | Kim |
| 2008/0175065 A1 | 7/2008 | Choi et al. |
| 2008/0177934 A1 | 7/2008 | Yu et al. |
| 2011/0280068 A1 | 11/2011 | Patapoutian et al. |
| 2012/0099376 A1 | 4/2012 | Maejima |
| 2012/0236640 A1 | 9/2012 | Goda et al. |
| 2012/0290768 A1 | 11/2012 | Rubowitz |
| 2014/0040550 A1* | 2/2014 | Nale ............... G06F 12/0868 711/118 |
| 2014/0149827 A1 | 5/2014 | Kim et al. |
| 2014/0281151 A1* | 9/2014 | Yu ................... G06F 1/30 711/103 |
| 2015/0161051 A1 | 6/2015 | Aikoh et al. |
| 2015/0325518 A1 | 11/2015 | Cho et al. |

FOREIGN PATENT DOCUMENTS

| | | |
|---|---|---|
| CN | 104503707 A | 4/2015 |
| JP | H05216775 A | 8/1993 |
| JP | 2008181497 A | 8/2008 |
| JP | 2008544345 A | 12/2008 |
| JP | 2014110057 A | 6/2014 |
| WO | 2014007249 A1 | 1/2014 |

* cited by examiner

DATA ACCESSING METHOD AND APPARATUS

CROSS-REFERENCE TO RELATED APPLICATIONS

This application is a continuation of International Application No. PCT/CN2015/097586, filed on Dec. 16, 2015, which claims priority to Chinese Patent Application No. 201410817949.0, filed on Dec. 24, 2014, The disclosures of the aforementioned applications are hereby incorporated by reference in their entireties.

TECHNICAL FIELD

This application relates to the storage field, and in particular, to a data accessing method and apparatus.

BACKGROUND

At present, each floating-gate transistor used for storage on a solid state drive (SSD) can store two or three bits. The bits stored in each floating-gate transistor are separately distributed on different pages. Therefore, pages in each block are classified into two or three different types according to storage locations in floating-gate transistors.

Using multi-level cell storage (MLC) as an example, two bits of a floating-gate transistor of the multi-level cell storage are respectively referred to as a least significant bit (LSB) and a most significant bit (MSB). Therefore, in each block, pages on which different bits in floating-gate transistors are separately located are classified into two types: an LSB page (for storing the LSB of the floating-gate transistor; the LSB page may also be referred to as a lower page and in this application, the LSB page is used uniformly) and an MSB page (for storing the MSB of the floating-gate transistor; the MSB page may also be referred to as an upper page and in this application, the MSB page is used uniformly). On a basis that data of corresponding bits of the LSB page and the MSB page is stored in a same floating-gate transistor, the LSB page and the MSB page belong to one group of shared pages. Specifically, Table 1 describes shared pages in a block of an MLC of a vendor.

TABLE 1

| LSB page | MSB page |
|---|---|
| 0 | 2 |
| 1 | 4 |
| 3 | 6 |
| 5 | 8 |
| 7 | 10 |

TABLE 1-continued

| LSB page | MSB page |
|---|---|
| 9 | 12 |
| 11 | 14 |
| ... | ... |
| ... | ... |
| 241 | 244 |
| 243 | 246 |
| 245 | 248 |
| 247 | 250 |
| 249 | 252 |
| 251 | 254 |
| 253 | 255 |

When data is being written, LSBs may need to be written before MSBs. Therefore, data can be written into a corresponding MSB page only after an entire LSB page is full. However, writing data into the MSB page causes interference to data that has been written into the LSB page before. Using the foregoing MLC of the vendor as an example, Table 2 describes interference data that is obtained during data writing according to an experiment.

TABLE 2

| Page | Page 0 | Page 1 | Page 2 | Page 3 | Page 4 | Page 5 | Page 6 | Page 7 | Page 8 |
|---|---|---|---|---|---|---|---|---|---|
| Page 0 | 0 | 0 | 125 | 105 | 5 | 3 | 4 | 6 | 3 |
| Page 1 | | 2 | 1 | 1 | 50 | 35 | 8 | 9 | 6 |
| Page 2 | | | 0 | 0 | 0 | 0 | 0 | 0 | 0 |
| Page 3 | | | | 0 | 0 | 0 | 296 | 193 | 25 |
| Page 4 | | | | | 17 | 15 | 14 | 15 | 16 |
| Page 5 | | | | | | 0 | 0 | 0 | 270 |
| Page 6 | | | | | | | 0 | 0 | 0 |
| Page 7 | | | | | | | | 1 | 0 |
| Page 8 | | | | | | | | | 0 |

The foregoing Table 2 describes interference on vertical pages when data is written into horizontal pages. It can be known from the foregoing Table 2 that, when data is being written into an MSB page, a relatively severe error correcting code (ECC) error or uncorrectable ECC error (UNC) may occur on a shared LSB page of the MSB page and on a shared LSB page of an adjacent MSB page. As shown in Table 2, underlined data has relatively severe errors.

Likewise, for a storage device whose floating-gate transistor stores more bits, for example, a storage device whose floating-gate transistor stores three bits, which means that a group of shared pages includes an LSB page, a middle significant bit (CSB) page, and an MSB page, writing into an upper page also causes write interference to a lower page.

Therefore, if data is read from a lower page when the lower page is subject to write interference, a data read error occurs. An existing common solution to this problem is to improve an ECC error correction capability of an SSD, so that a controller of the storage device corrects a data read error by using an ECC when reading data from a page that is subject to write interference. However, improving the ECC error correction capability requires support from the controller. In addition, when space of a spare area provided by the storage device for ECCs is given, it is difficult to further improve the ECC error correction capability. Therefore, a read error still occurs during data reading due to write interference.

SUMMARY

This application provides a data accessing method and apparatus, so as to reduce data read errors caused by write interference.

A first aspect of this application provides a data accessing method. The method includes: when receiving a read instruction that includes a read target address, determining whether a preset cache area has cached data that the read target address points to; and if the preset cache area has cached the data that the read target address points to, finding a cache address corresponding to the read target address according to a first mapping relationship, and reading, from the preset cache area, data that the cache address points to, where the first mapping relationship is used to record a correspondence between the target address and the cache address; or if the preset cache area has not cached the data that the read target address points to, reading, from non-volatile storage space, the data that the read target address points to.

With reference to the first aspect, in a first possible implementation manner of the first aspect, the method further includes: when receiving a write instruction, determining whether a write target address in the write instruction belongs to a most significant bit page MSB page in the non-volatile storage space, where the write instruction includes to be written data and the write target address; and if the write target address does not belong to an MSB page in the non-volatile storage space, storing, in the preset cache area and the non-volatile storage space that is corresponding to the write target address, the to be written data, and establishing the first mapping relationship between the cache address and the target address; or if the write target address belongs to an MSB page in the non-volatile storage space, storing, in the non-volatile storage space corresponding to the write target address, the to be written data.

With reference to the first possible implementation manner of the first aspect, in a second possible implementation manner of the first aspect, the method further includes: obtaining a maximum page number difference m between an MSB page and an LSB page in all groups of shared pages in the non-volatile storage space, where m is a natural number; and allocating cache space with a size of at least n*p+m pages for the preset cache area, where p represents a quantity of shared pages of an MSB page in the non-volatile storage space, and n is a natural number and is at least 1.

With reference to the second possible implementation manner of the first aspect, in a third possible implementation manner of the first aspect, the method further includes: if the write target address belongs to an MSB page in the non-volatile storage space, determining whether the MSB page in which the write target address is located is the last MSB page in a block; if the MSB page in which the write target address is located is not the last MSB page in the block, obtaining an address of a shared page of the $n^{th}$ MSB page as counted forward from the MSB page in which the write target address is located, and using the obtained address as a data release address; or if the MSB page in which the write target address is located is the last MSB page in the block, obtaining addresses of shared pages of the last n+1 MSB pages in the block, and using the obtained addresses as the data release addresses; and releasing data that is in the preset cache area and that a cache address having the first mapping relationship with the data release address points to, and deleting the data release address from the first mapping relationship.

With reference to the first aspect or any one of the first to third possible implementation manners of the first aspect, in a fourth possible implementation manner of the first aspect, the method further includes: during power-off, saving data that is in the preset cache area in the non-volatile storage space, and establishing a second mapping relationship between the cache address and a save address that is in the non-volatile storage space; and during power-on, caching, at the cache address in the preset cache area according to the second mapping relationship, the data that the save address in the non-volatile storage space points to.

With reference to the first aspect or the first to third possible implementation manners of the first aspect, in a fifth possible implementation manner of the first aspect, the preset cache area is located in a double data rate synchronous dynamic random access memory DDR or a static random access memory SRAM.

With reference to the first aspect or the first to third possible implementation manners of the first aspect, in a sixth possible implementation manner of the first aspect, the non-volatile storage space is storage space of a solid state drive SSD.

A second aspect of this application provides a data reading apparatus. The apparatus includes a first determining module, a first reading module, and a second reading module. The first determining module is configured to: when receiving a read instruction that includes a read target address, determine whether a preset cache area has cached data that the read target address points to, and send a first determining result to the first and second reading modules. The first reading module is configured to: when the preset cache area has cached the data that the read target address points to, find a cache address corresponding to the read target address according to a first mapping relationship, and read, from the preset cache area, data that the cache address points to, where the first mapping relationship is used to record a correspondence between the target address and the cache address. The second reading module is configured to: when the preset cache area has not cached the data that the read target address points to, read, from non-volatile storage space, the data that the read target address points to.

With reference to the second aspect, in a first possible implementation manner of the second aspect, the apparatus further includes a second determining module, a first writing module, and a second writing module. The second determining module is configured to: when receiving a write instruction, determine whether a write target address in the write instruction belongs to a most significant bit page MSB page in the non-volatile storage space, and send a second determining result to the first and second writing modules, where the write instruction includes to be written data and the write target address. The first writing module is configured to: when it is determined that the write target address does not belong to an MSB page in the non-volatile storage space, store, in the preset cache area and the non-volatile storage space that is corresponding to the write target address, the to be written data, and establish the first mapping relationship between the cache address and the target address. The second writing module is configured to: when it is determined that the write target address belongs to an MSB page in the non-volatile storage space, store, in the non-volatile storage space corresponding to the write target address, the to be written data.

With reference to the first possible implementation manner of the second aspect, in a second possible implementation manner of the second aspect, the apparatus further includes a third obtaining module and an allocating module.

The third obtaining module is configured to obtain a maximum page number difference m between an MSB page and an LSB page in all groups of shared pages in the non-volatile storage space, and send m to the allocating module, where m is a natural number. The allocating module is configured to allocate cache space with a size of at least n*p+m pages for the preset cache area, where p represents a quantity of shared pages of an MSB page in the non-volatile storage space, and n is a natural number and is at least 1.

With reference to the second possible implementation manner of the second aspect, in a third possible implementation manner of the second aspect, the apparatus further includes a third determining module, a first obtaining module, a second obtaining module, and a releasing module. The third determining module is configured to: when the write target address belongs to an MSB page in the non-volatile storage space, determine whether the MSB page in which the write target address is located is the last MSB page in a block, and send a third determining result to the first and second obtaining modules. The first obtaining module is configured to: when the MSB page in which the write target address is located is not the last MSB page in the block, obtain an address of a shared page of the $n^{th}$ MSB page as counted forward from the MSB page in which the write target address is located, use the obtained address as a data release address, and send the data release address to the releasing module. The second obtaining module is configured to: when the MSB page in which the write target address is located is the last MSB page in the block, obtain addresses of shared pages of the last n+1 MSB pages in the block, use the obtained addresses as the data release addresses, and send the data release addresses to the releasing module. The releasing module is configured to release data that is in the preset cache area and that a cache address having the first mapping relationship with the data release address points to, and delete the data release address from the first mapping relationship.

With reference to the second aspect or the first to third possible implementation manners of the second aspect, in a fourth possible implementation manner of the second aspect, the apparatus further includes a saving module and a caching module. The saving module is configured to: during power-off, save data that is in the preset cache area in the non-volatile storage space, establish a second mapping relationship between the cache address and a save address that is in the non-volatile storage space, and send the second mapping relationship to the caching module. The caching module is configured to: during power-on, cache, at the cache address in the preset cache area according to the second mapping relationship, the data that the save address in the non-volatile storage space points to.

With reference to the second aspect or the first to third possible implementation manners of the second aspect, in a fifth possible implementation manner of the second aspect, the preset cache area is located in a double data rate synchronous dynamic random access memory DDR or a static random access memory SRAM.

With reference to the second aspect or the first to third possible implementation manners of the second aspect, in a sixth possible implementation manner of the second aspect, the non-volatile storage space is storage space of a solid state drive SSD.

In the foregoing solutions, a manner in which cached data is preferentially read is used. When a preset cache area has cached data that a read target address points to, the data is preferentially read from the preset cache area. Because data in the cache area is not subject to write interference as in non-volatile storage space, read errors caused by write interference are reduced, and reliability of a storage device is improved.

DESCRIPTION OF EMBODIMENTS

In the following description, to illustrate rather than limit, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

Figure 1:
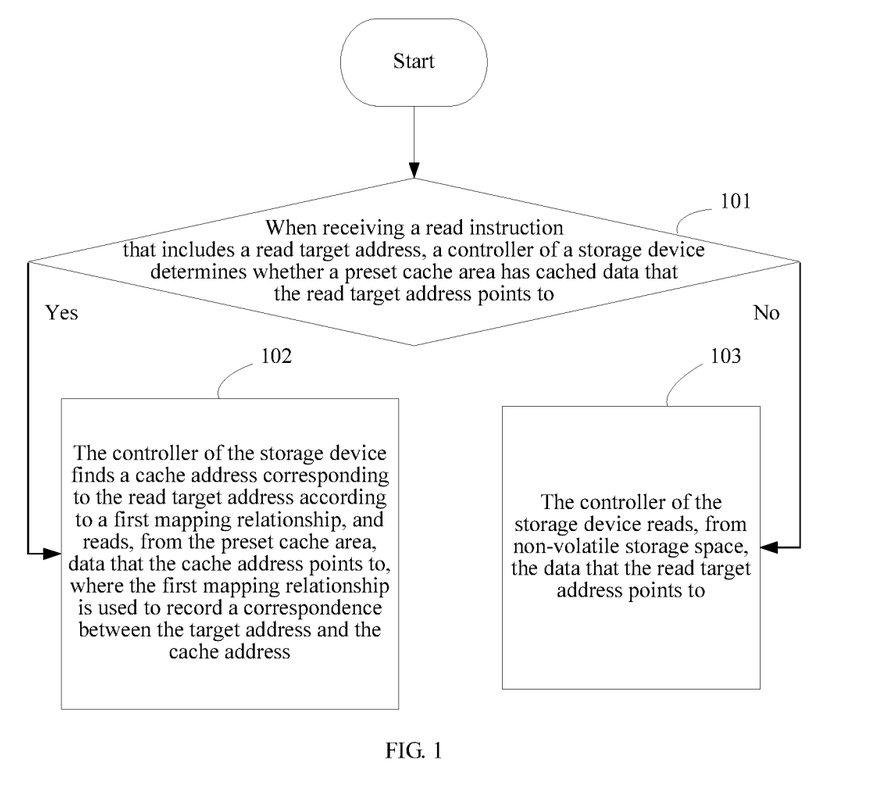
FIG. 1 is a flowchart of an implementation manner of a data accessing method according to this application.

Referring to FIG. 1, FIG. 1 is a flowchart of an implementation manner of a data accessing method according to this application. The method in this implementation manner is executed by a controller of a storage device. The storage device in this application may be any non-volatile storage device whose floating-gate transistor can store at least two bits, for example, an SSD of an MLC type (each floating-gate transistor stores two bits) or a trinary-level cell (TLC) type (each floating-gate transistor stores three bits). The storage device includes non-volatile storage space.

The non-volatile storage space is storage space formed by floating-gate transistors, and for example, is specifically a storage matrix of an SSD. The non-volatile storage space of the storage device includes multiple groups of shared pages. For example, non-volatile storage space of an MLC-type storage device includes multiple groups of shared pages, and each group of shared pages includes an MSB page and an LSB page. Non-volatile storage space of a TLC-type storage device includes multiple groups of shared pages, and each group of shared pages includes an MSB page, a CSB page, and an LSB page.

Specifically, the method in this implementation manner includes the following steps.

101. When receiving a read instruction that includes a read target address, the controller of the storage device determines whether a preset cache area has cached data that the read target address points to.

As described in the background, when data is being written into an MSB page in non-volatile storage space of a storage device, write interference is caused to a shared page of the MSB page, such as a corresponding LSB page or CSB page, and a data read error may occur as a result. To avoid write interference brought by writing an MSB page, according to this application, data subject to the write interference is cached for backup, and when such a type of data is read, reading from the preset cache area is preferentially considered.

Specifically, for example, when data is being written, the controller of the storage device stores, in both the preset cache area and the non-volatile storage space, the data that is of the storage device and that is subject to the write interference, and establishes a first mapping relationship between a cache address and an address of the non-volatile storage space. When the controller of the storage device receives, from a SATA/SAS/PCIe interface, a read instruction sent by a host, the read instruction includes a read target address, to instruct the controller to read, from the non-volatile storage space, data that the read target address points to. The controller checks whether a first mapping relationship of the read target address exists. If the first mapping relationship exists, the controller determines that the preset cache area has cached the data that the read target address points to, and executes step 102. If the first mapping relationship does not exist, the controller determines that the preset cache area has not cached the data that the read target address points to, and executes step 103.

It may be understood that, the controller of the storage device may determine, not by using the first mapping relationship, whether to-be-read data has been cached. In another implementation manner, the controller may further additionally set an identifier that records whether the data at the address has been cached. When the data is being read, the identifier of the address is read to determine whether the data at the read target address has been cached. Therefore, a manner of determining whether to-be-read data has been cached is not specifically limited herein.

In addition, alternatively, when receiving the read instruction, the controller of the storage device may first determine whether the data that the read target address points to is data subject to write interference, for example, determine whether the read target address belongs to an MSB page. If the read target address does not belong to an MSB page, the data that the read target address points to is data subject to write interference. In this case, the controller determines whether the preset cache area has cached the data that the read target address points to.

102. The controller of the storage device finds a cache address corresponding to the read target address according to a first mapping relationship, and reads, from the preset cache area, data that the cache address points to, where the first mapping relationship is used to record a correspondence between the target address and the cache address.

According to a principle of preferentially reading from a cache, if it is determined that the preset cache area has cached the data that the read target address points to, the controller of the storage device finds, according to the saved first mapping relationship, the cache address corresponding to the read target address, and reads the data at the cache address from the preset cache area, so as to implement data reading. Because data in the cache area is not subject to write interference as in a storage matrix, reading data from the cache area ensures data reading correctness.

103. The controller of the storage device reads, from the non-volatile storage space, the data that the read target address points to.

If determining that the preset cache area has not cached the data that the read target address points to, the controller of the storage device reads, in a normal reading manner, the data at the read target address from the non-volatile storage space, so as to implement data reading.

In this implementation manner, a manner in which cached data is preferentially read is used. When a preset cache area has cached data that a read target address points to, the data is preferentially read from the preset cache area. Because data in the cache area is not subject to write interference as in non-volatile storage space, read errors caused by write interference are reduced, and reliability of a storage device is improved.

Figure 2:
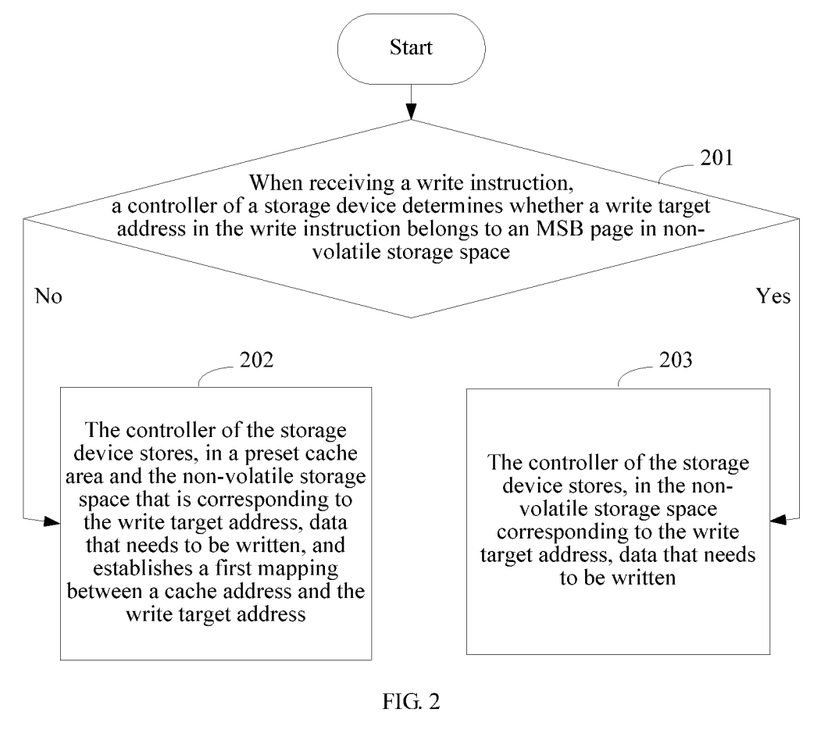
FIG. 2 is a partial flowchart of another implementation manner of a data accessing method according to this application.

Referring to FIG. 2, FIG. 2 is a partial flowchart of another implementation manner of a data accessing method according to this application. In this implementation manner, before executing the method steps of the foregoing implementation manner, the controller of the storage device further executes the following steps.

201. When receiving a write instruction, the controller of the storage device determines whether a write target address in the write instruction belongs to an MSB page in non-volatile storage space, where the write instruction includes to be written data and the write target address.

Each floating-gate transistor of the storage device in this application can store at least two bits. Therefore, pages of the non-volatile storage space of the storage device are classified into at least two types: an LSB page and an MSB page. When the floating-gate transistor can store three bits, the pages of the non-volatile storage space of the storage device further include a CSB page.

The controller of the storage device receives, from an interface such as a SATA/SAS/PCIe interface, a write instruction sent by a host. The write instruction includes to be written data and a write target address, so as to instruct the controller to store, in the non-volatile storage space that the write target address points to, the to be written data. After receiving the write instruction, the controller first determines whether the write target address belongs to an MSB page in the non-volatile storage space. If the write target address does not belong to an MSB page in the non-volatile storage space, the controller executes step 202. If the write target address belongs to an MSB page in the non-volatile storage space, the controller executes step 203.

202. The controller of the storage device stores, in the preset cache area and the non-volatile storage space that is corresponding to the write target address, the to be written data, and establishes a first mapping relationship between a cache address and the write target address.

As described in the background, when data is being written into an MSB page in non-volatile storage space of a storage device, write interference is caused to a shared page of the MSB page, such as a corresponding LSB page or CSB page, and a data read error may occur as a result. Therefore, when the controller determines that the write target address does not belong to an MSB page, it means that the to be written data may be subject to write interference when data is being written into an MSB page subsequently. Therefore, the controller stores, in the non-volatile storage space that the write target address points to, the to be written data, and caches the data into the preset cache area as a backup. The preset cache area may be a double data rate synchronous dynamic random access memory (DDR SDRAM) in the storage device. For example, a conventional SSD is inherently provided therein with a DDR, and data passes the DDR no matter in data writing or data reading. Based on this storage manner, the preset cache area may be preferentially configured on the DDR, that is, some cache space is provided on the DDR as the preset cache area. Certainly, the preset cache area may alternatively be a memory other than the non-volatile storage space, for example, a static random access memory (SRAM).

After the foregoing writing is complete, the controller obtains a cache address at which the to be written data is cached in the preset cache area, and establishes a first mapping relationship between the cache address and the write target address, so that the data in the preset cache area corresponds to the data in the non-volatile storage space. The first mapping relationship may be saved in a tabular form in the non-volatile storage space of the storage device or in the preset cache area.

203. The controller of the storage device stores, in the non-volatile storage space corresponding to the write target address, the to be written data.

Because an MSB page in the non-volatile storage space is not subject to write interference, when the controller determines that the to be written data belongs to an MSB page in the non-volatile storage space, the to be written data does not need to be cached for backup, and the data is directly stored in the non-volatile storage space according to the write target address.

After executing the foregoing steps 201-203, the controller of the storage device executes steps 101-103 shown in FIG. 1.

In this implementation manner, data for which a read error may occur due to write interference of an MSB page is cached for backup. In addition, during reading of this part of data, the data is preferentially read from a cache. This avoids the occurrence of an error in reading the data due to that the data is currently subject to write interference, thereby reducing read errors caused by write interference, and improving reliability of a storage device.

Figure 3:
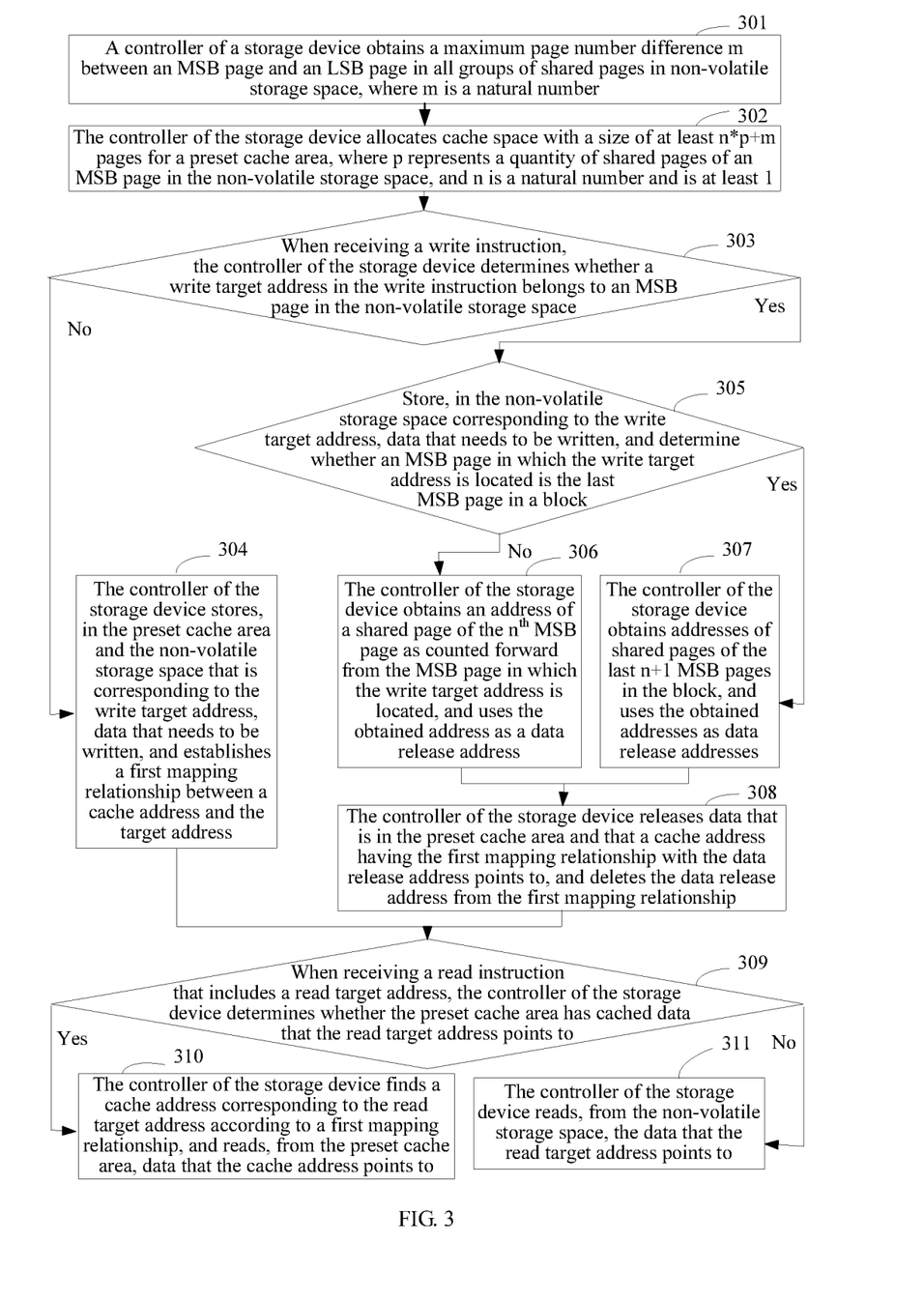
FIG. 3 is a flowchart of still another implementation manner of a data accessing method according to this application.

Referring to FIG. 3, FIG. 3 is a flowchart of still another implementation manner of a data accessing method according to this application. Specifically, the method includes the following steps.

301. A controller of a storage device obtains a maximum page number difference m between an MSB page and an LSB page in all groups of shared pages in non-volatile storage space, where m is a natural number.

Storage devices of different vendors provide different shared pages. Using the storage device shown in Table 1 in the background as an example, the first group of shared pages in each block of the storage device is page 0-page 2. That is, there is a difference of 2 pages between the MSB page and the LSB page. The second group of shared pages is page 1-page 4. That is, there is a difference of 3 pages between the MSB page and the LSB page. By traversing all groups of shared pages in a block of the storage device, it is found that page number differences between MSB pages and corresponding LSB pages are all two or three. Therefore, the maximum page number difference between an MSB page and an LSB page in all the groups of shared pages of the storage device is 3.

302. The controller of the storage device allocates cache space with a size of at least $n*p+m$ pages for a preset cache area, where p represents a quantity of shared pages of an MSB page in the non-volatile storage space, and n is a natural number and is at least 1.

To reduce occupation of cache space as much as possible, cache space for data no longer subject to write interference is dynamically released in this implementation manner. A cache space size required by the preset cache area is related to the maximum page number difference m between an MSB page and an LSB page in all the groups of shared pages of the storage device and a dynamic release rule. There is a maximum page number difference of m between an MSB page and an LSB page in the groups of shared pages of the non-volatile storage space of the storage device. It means that the preset cache area requires cache space of at least m pages, to ensure that a shared page of an MSB page (such as an LSB page or a CSB page corresponding to the MSB page) can be cached in the preset cache area before the MSB page is fully written, so as to avoid a read error due to write interference of the MSB page. In addition, the dynamic release rule of this application is that, when data is being written into an MSB page, it is ensured that shared pages of at least n MSB pages (such as LSB pages or CSB pages corresponding to the MSB pages) as counted forward from the MSB pages can be cached in the preset cache area. According to experimental data, when n is at least 1, it can be essentially ensured that data currently subject to relatively severe write interference can all be cached.

According to the foregoing principle for specifying the cache space size and the foregoing rule for setting groups of shared pages of the non-volatile storage space of the storage device, to ensure that data currently subject to relatively severe write interference can all be cached, the controller of the storage device allocates, for the preset cache area, cache space of at least $m+n*p$ pages, for example, allocates cache space of $m+n*p$ pages. p represents a quantity of shared pages of an MSB page in the non-volatile storage space of the storage device. For example, one group of shared pages of an MLC-type storage device includes an MSB page and an LSB page. Therefore, a quantity of shared pages of the MSB page in non-volatile storage space of the storage device is 1, that is, the LSB page. One group of shared pages of a TLC-type storage device includes an MSB page, a CSB page, and an LSB page. Therefore, a quantity of shared pages of the MSB page in non-volatile storage space of the storage device is 2, including the CSB page and the LSB page.

303. When receiving a write instruction, the controller of the storage device determines whether a write target address in the write instruction belongs to an MSB page in the non-volatile storage space, where the write instruction includes to be written data and the write target address.

After receiving the write instruction, the controller first determines whether the write target address belongs to an MSB page in the non-volatile storage space of the storage device. If the write target address does not belong to an MSB page in the non-volatile storage space, the controller executes step 304. If the write target address belongs to an MSB page in the non-volatile storage space, the controller executes step 305.

304. The controller of the storage device stores, in the preset cache area and the non-volatile storage space that is corresponding to the write target address, the to be written data, and establishes a first mapping relationship between a cache address and the target address.

305. The controller of the storage device stores, in the non-volatile storage space corresponding to the write target address, the to be written data, and determines whether an MSB page in which the write target address is located is the last MSB page in a block.

If the write target address belongs to an MSB page in the non-volatile storage space, the controller of the storage device stores, only in the non-volatile storage space that the write target address points to, the to be written data, and determines whether the MSB page in which the write target address is located is the last MSB page in the block. For example, the last MSB page in the block shown in Table 1 is page 255. If it is determined that the write target address does not belong to page 255, the controller executes step 306. If it is determined that the write target address belongs to page 255, the controller executes step 307.

306. The controller of the storage device obtains an address of a shared page of the $n^{th}$ MSB page as counted forward from the MSB page in which the write target address is located, and uses the obtained address as a data release address.

In this implementation manner, a dynamic cache release manner is used. A specific rule is that, when data is being written into an MSB page, it is ensured that shared pages of at least n MSB pages (such as LSB pages or CSB pages corresponding to the MSB pages) can be cached in a preset cache area. Using the MLC-type storage device shown in Table 2 in the background as an example, it can be known from Table 2 that an LSB page is subject to relatively severe write interference in a process between writing an MSB page corresponding to the LSB page and starting writing a next MSB page. It can be ensured that data currently subject to relatively severe write interference can all be cached, only when a minimum value of n is 1. However, to further reduce write interference, n is preferentially at least 2, that is, an LSB page corresponding to an MSB page is not deleted before writing of data into at least two MSB pages next to the MSB page is complete.

Specifically, still using the storage device described in Table 1 in the background as an example, it is assumed that a current write target address belongs to page 6, which is an MSB page, and does not belong to the last MSB page. As counted forward from page 6, the first MSB page is page 4, and the second MSB page is page 2. If n is 1, it is considered that no write interference will be caused to a shared page of page 4, that is, page 1, after data is written into page 6. Therefore, the controller obtains an address of page 1 and uses the address of page 1 as a data release address, so as to release cache space that is in the preset cache area and that is corresponding to page 1. According to the foregoing dynamic cache release rule, when data is written into page 2, data in the cache area is not released; when data is written into page 4, page 0 in the cache area is released; when data is written into page 6, page 1 in the cache area is released; when data is written into page 8, page 3 in the cache area is released; and so on. In this way, correct data can be read from the cache before write interference indicated by the underlined data in Table 2 is eliminated.

It is the same for a storage device whose floating-gate transistor stores more than two bits. That is, addresses of shared pages (if the floating-gate transistor stores three bits, a corresponding LSB page and a corresponding CSB page are included) of the $n^{th}$ MSB page as counted forward from the MSB page in which the write target address is located are obtained and used as data release addresses.

307. The controller of the storage device obtains addresses of shared pages of the last n+1 MSB pages in the block, and uses the obtained addresses as the data release addresses.

If the MSB page in which the write target address is located is the last MSB page in the block, it means that write interference of all pages in the block is eliminated, and therefore all data cache space of the block can be released. According to the cache release rule of the foregoing step 306, when data is being written into the last MSB page, data of shared pages of the last n+1 MSB pages in the block remains cached in the preset cache area, where n is a natural number and is at least 1. Therefore, the controller obtains the addresses of the shared pages (which are LSB pages if the floating-gate transistor stores two bits, or include LSB pages and CSB pages if the floating-gate transistor stores three bits) of the last n+1 MSB pages in the block, and uses the obtained addresses as the data release addresses.

308. The controller of the storage device releases data that is in the preset cache area and that a cache address having the first mapping relationship with the data release address points to, and deletes the data release address from the first mapping relationship.

The controller of the storage device obtains, according to the first mapping relationship, the cache address having the first mapping relationship with the data release address, and releases the data at the cache address. In this way, cache space can be dynamically released while ensuring that data currently subject to severe write interference remains cached. Because the cache space is already released, the data release address and the cache address in the first mapping relationship are deleted.

309. When receiving a read instruction that includes a read target address, the controller of the storage device determines whether the preset cache area has cached data that the read target address points to. If the preset cache area has cached the data that the read target address points to, the controller executes step 310. If the preset cache area has not cached the data that the read target address points to, the controller executes step 311.

310. The controller of the storage device finds a cache address corresponding to the read target address according to a first mapping relationship, and reads, from the preset cache area, data that the cache address points to.

311. The controller of the storage device reads, from the non-volatile storage space, the data that the read target address points to.

In this implementation manner, data for which a read error may occur due to write interference of an MSB page is cached for backup. In addition, during reading of this part of data, the data is preferentially read from a cache. This avoids the occurrence of an error in reading the data due to that the data is currently subject to write interference, thereby greatly reducing read errors caused by write interference Moreover, in this implementation manner, because when data is being written into an MSB page of a storage device, write interference is caused only to a shared page of the MSB page and to a shared page of an adjacent MSB page before the MSB page, a manner of dynamically releasing a cache is used, to reduce required cache space. In addition, in this application, cache space is allocated according to a maximum page number difference m of shared page groups of a storage device, so as to enable compatibility with storage devices of different vendors.

Figure 4:
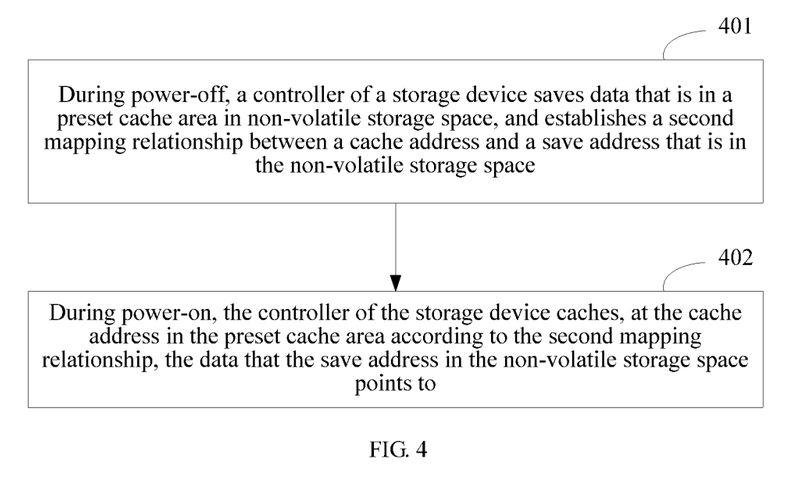
FIG. 4 is a partial flowchart of yet another implementation manner of a data accessing method according to this application.

Referring to FIG. 4, FIG. 4 is a partial flowchart of yet another implementation manner of a data accessing method according to this application. The method in this implementation manner includes the steps in the foregoing implementation manner and further includes the following steps.

401. During power-off, the controller of the storage device saves data that is in the preset cache area in the non-volatile storage space, and establishes a second mapping relationship between the cache address and a save address that is in the non-volatile storage space.

After the storage device is powered off, the data in the preset cache area is lost. To ensure that the data in the non-volatile storage space can still be correctly read after next power-on, during power-off, the controller saves the data that is in the preset cache area in the non-volatile storage space, and establishes the second mapping relationship between the cache address that is in the preset cache area and the save address that is in the non-volatile storage space, so that the data previously cached in the preset cache area can correspond to the data saved in the non-volatile storage space.

402. During power-on, the controller of the storage device caches, at the cache address in the preset cache area according to the second mapping relationship, the data that the save address in the non-volatile storage space points to.

When powered on again, the controller of the storage device obtains the save address that is in the non-volatile storage space and that is in the second mapping relationship, and correspondingly caches the data at the save address at the cache address that has the second mapping relationship with the save address, so as to cache again, according to the original cache address, the data that is cached in the preset cache area before power-off. In this way, when data that is in the non-volatile storage space and that has been cached needs to be read, corresponding cached data can be read according to the first mapping relationship that is previously established, and thereby correct data reading is implemented.

Figure 5:
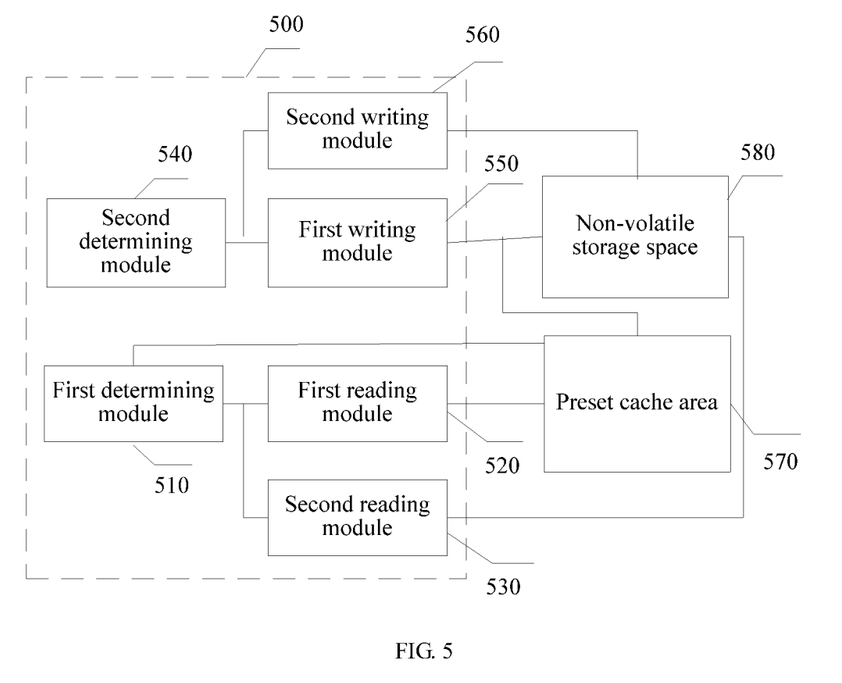
FIG. 5 is a schematic structural diagram of an implementation manner of a data reading apparatus according to this application.

Referring to FIG. 5, FIG. 5 is a schematic structural diagram of an implementation manner of a data reading apparatus according to this application. In this implementation manner, the data reading apparatus 500 may be specifically a controller of a storage device. The storage device may be any non-volatile storage device whose floating-gate transistor can store at least two bits, for example, an MLC-type or TLC-type SSD. The data reading apparatus 500 includes a first determining module 510, a first reading module 520, and a second reading module 530. The data reading apparatus 500 is connected to a preset cache area 570 and non-volatile storage space 580.

The first determining module 510 is configured to: when receiving a read instruction that includes a read target address, determine whether the preset cache area 570 has cached data that the read target address points to, and send a first determining result to the first reading module 520 and the second reading module 530.

To avoid write interference brought by writing an MSB page, according to this application, data that may be subject to the write interference is cached for backup, and when such a type of data is read, reading from the preset cache area 570 is preferentially considered.

Specifically, for example, the first determining module 510 receives, from a SATA/SAS interface, a read instruction sent by a host. The read instruction includes a read target address, so as to instruct to read, from the non-volatile storage space 580, the data that the read target address points to. The first determining module 510 checks whether a first mapping relationship of the read target address exists. If the first mapping relationship exists, the first determining module 510 determines that the preset cache area 570 has cached the data that the read target address points to. If the first mapping relationship does not exist, the first determining module 510 determines that the preset cache area 570 has not cached the data that the read target address points to.

It may be understood that, the first determining module 510 may not determine, by using the first mapping relationship, whether to-be-read data is cached. In another implementation manner, the first determining module 510 may further additionally set an identifier that records whether the data at the address is cached. When the data is being read, the identifier of the address is read to determine whether the data at the read target address has been cached. Therefore, a manner of determining whether to-be-read data has been cached is not specifically limited herein.

In addition, when receiving the read instruction, the first determining module 510 may further first determine whether the data that the read target address points to is data subject to write interference, for example, determine whether the read target address belongs to an MSB page. If the read target address does not belong to an MSB page, the first determining module 510 further determines whether the preset cache area 570 has cached the data that the read target address points to.

The first reading module 520 is configured to: when the preset cache area has cached the data that the read target address points to, find a cache address corresponding to the read target address according to the first mapping relationship, and read, from the preset cache area 570, data that the cache address points to, where the first mapping relationship is used to record a correspondence between the target address and the cache address.

According to a principle of preferentially reading from a cache, when the first determining module 510 determines that the preset cache area 570 has cached the data that the read target address points to, the first reading module 520 obtains, according to the saved first mapping relationship, the cache address corresponding to the read target address, and reads the data at the cache address from the preset cache area 570, so as to implement data reading. Because data in the cache area is not subject to write interference as in a storage matrix, reading data from the cache area ensures data reading correctness.

The second reading module 530 is configured to: when the preset cache area 570 has not cached the data that the read target address points to, read, from the non-volatile storage space 580, the data that the read target address points to.

When the first determining module 510 determines that the preset cache area 570 has not cached the data that the read target address points to, the second reading module 530 reads, in a normal reading manner, the data at the read target address from the non-volatile storage space 580, so as to implement data reading.

Optionally, the data reading apparatus 500 in this implementation manner may further include a second determining module 540, a first writing module 550, and a second writing module 560.

The second determining module 540 is configured to: when receiving a write instruction, determine whether a write target address in the write instruction belongs to an MSB page in the non-volatile storage space, and send a second determining result to the first writing module 550 and the second writing module 560, where the write instruction includes to be written data and the write target address.

The second determining module 540 receives, from an interface such as a SATA/SAS/PCIe interface, a write instruction sent by a host. The write instruction includes to be written data and a write target address, so as to instruct to store, in the non-volatile storage space 580 (such as a storage matrix of the storage device) that the write target address points to, the to be written data. After receiving the write instruction, the second determining module 540 first determines whether the write target address belongs to an MSB page in the non-volatile storage space of the storage device.

The first writing module 550 is configured to: when it is determined that the write target address does not belong to an MSB page in the non-volatile storage space, store, in the preset cache area 570 and the non-volatile storage space 580 that is corresponding to the write target address, the to be written data, and establish a first mapping relationship between a cache address and the write target address.

When the second determining module 540 determines that the write target address does not belong to an MSB page, it means that the to be written data may be subject to write interference when data is written into a subsequent MSB page. Therefore, the first writing module 550 stores, in the non-volatile storage space 580 that the write target address points to, the to be written data, and caches the data into the preset cache area as a backup. The preset cache area 570 may be a DDR or SRAM in the storage device.

After the foregoing writing is complete, the first writing module 550 obtains a cache address at which the to be written data is cached in the preset cache area 570, and establishes a first mapping relationship between the cache address and the write target address, so that the data in the preset cache area 570 corresponds to the data in the non-volatile storage space 580. The first mapping relationship may be saved in a tabular form in the non-volatile storage space 580 of the storage device or in the preset cache area 570.

The second writing module 560 is configured to: when it is determined that the write target address belongs to an MSB page in the non-volatile storage space, store, in the non-volatile storage space 580 corresponding to the write target address, the to be written data.

Because an MSB page in the non-volatile storage space is not subject to write interference, when the second determining module 540 determines that the to be written data belongs to an MSB page in the non-volatile storage space, the to be written data does not need to be cached for backup, and the data is directly stored in the non-volatile storage space 580 according to the write target address.

In this implementation manner, data for which a read error may occur due to write interference of an MSB page is cached for backup. In addition, during reading of this part of data, the data is preferentially read from a cache. This avoids the occurrence of an error in reading the data due to that the data is currently subject to write interference, thereby reducing read errors caused by write interference, and improving reliability of a storage device.

Figure 6:
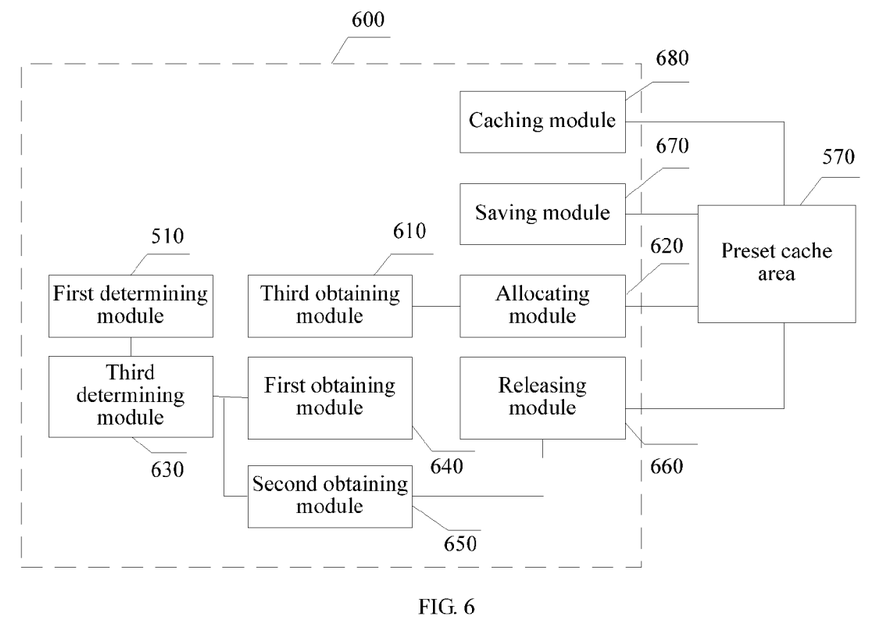
FIG. 6 is a schematic structural diagram of another implementation manner of a data reading apparatus according to this application.

Referring to FIG. 6, FIG. 6 is a schematic structural diagram of an implementation manner of a data reading apparatus according to this application. Specifically, in addition to the modules included in the foregoing implementation manner (if a module in FIG. 5 is not mentioned in the following description of this implementation manner, the module is not shown in FIG. 6, but it does not mean that the data reading apparatus in this implementation manner does not include the module), the data reading apparatus 600 further includes a third obtaining module 610, an allocating module 620, a third determining module 630, a first obtaining module 640, a second obtaining module 650, a releasing module 660, a saving module 670, and a caching module 680.

The third obtaining module 610 is configured to obtain a maximum page number difference m between an MSB page and an LSB page in all groups of shared pages in the non-volatile storage space, and send m to the allocating module 620, where m is a natural number.

Storage devices of different vendors provide different shared pages. Using the storage device shown in Table 1 in the background as an example, the first group of shared pages in each block of the storage device is page 0-page 2. That is, there is a difference of 2 pages between the MSB page and the LSB page. The second group of shared pages is page 1-page 4. That is, there is a difference of 3 pages between the MSB page and the LSB page. By traversing all groups of shared pages in a block of the storage device, it is found that page number differences between MSB pages and corresponding LSB pages are all two or three. Therefore, the maximum page number difference between an MSB page and an LSB page in all the groups of shared pages of the storage device is 3.

The allocating module 620 is configured to allocate cache space with a size of at least n*p+m pages for the preset cache area 570, where p represents a quantity of shared pages of an MSB page in the non-volatile storage space, and n is a natural number and is at least 1.

To reduce occupation of cache space as much as possible, cache space for data no longer subject to write interference is dynamically released in this implementation manner. A cache space size required by the preset cache area 570 is related to the maximum page number difference m between an MSB page and an LSB page in all the groups of shared pages of the storage device and a dynamic release rule.

According to the foregoing principle for specifying the cache space size and the foregoing rule for setting groups of shared pages of the non-volatile storage space of the storage device, to ensure that data currently subject to relatively severe write interference can all be cached, the allocating module 620 allocates, for the preset cache area, cache space of at least m+n*p pages, for example, allocates cache space of m+n*p pages. p represents a quantity of shared pages of an MSB page in the non-volatile storage space of the storage device. For example, one group of shared pages of an MLC-type storage device includes an MSB page and an LSB page. Therefore, a quantity of shared pages of the MSB page in non-volatile storage space of the storage device is 1, that is, the LSB page. One group of shared pages of a TLC-type storage device includes an MSB page, a CSB page, and an LSB page. Therefore, a quantity of shared pages of the MSB page in non-volatile storage space of the storage device is 2, including the CSB page and the LSB page.

The third determining module 630 is configured to: when the write target address belongs to an MSB page in the non-volatile storage space, determine whether the MSB page in which the write target address is located is the last MSB page in a block, and send a third determining result to the first obtaining module 640 and the second obtaining module 650.

For example, when the second determining module 540 determines that the write target address belongs to an MSB page in the non-volatile storage space, the third determining module 630 determines whether the MSB page in which the write target address is located is the last MSB page in the block.

The first obtaining module 640 is configured to: when the MSB page in which the write target address is located is not the last MSB page in the block, obtain an address of a shared page of the $n^{th}$ MSB page as counted forward from the MSB page in which the write target address is located, use the obtained address as a data release address, and send the data release address to the releasing module 660.

In this implementation manner, a dynamic cache release manner is used. A specific rule is that, when data is being written into an MSB page, it is ensured that shared pages of at least n MSB pages (such as LSB pages or CSB pages corresponding to the MSB pages) can be cached in a preset cache area. Using the MLC-type storage device shown in Table 2 in the background as an example, it can be known from Table 2 that an LSB page is subject to relatively severe write interference in a process between writing an MSB page corresponding to the LSB page and starting writing a next MSB page. It can be ensured that data currently subject to relatively severe write interference can all be cached, only when a minimum value of n is 1. However, to further reduce read interference, n is preferentially at least 2. That is, an LSB page corresponding to an MSB page is not deleted before writing of data into at least two MSB pages next to the MSB page is complete.

Specifically, still using the storage device described in Table 1 in the background as an example, it is assumed that a current write target address belongs to page 6, which is an MSB page, and does not belong to the last MSB page. As counted forward from page 6, the first MSB page is page 4, and the second MSB page is page 2. If n is 1, it is considered that no write interference will be caused to a shared page of page 4, that is, page 1, after data is written into page 6. Therefore, the first obtaining module 640 uses an address of page 1 as a data release address, so as to release cache space that is in the preset cache area 570 and that is corresponding to page 1.

It is the same for a storage device whose floating-gate transistor stores more than two bits. That is, addresses of shared pages (if the floating-gate transistor stores three bits, a corresponding LSB page and a corresponding CSB page are included) of the $n^{th}$ MSB page as counted forward from the MSB page in which the write target address is located are obtained and used as data release addresses.

The second obtaining module 650 is configured to: when the MSB page in which the write target address is located is the last MSB page in the block, obtain addresses of shared pages of the last n+1 MSB pages in the block, use the obtained addresses as the data release addresses, and send the data release addresses to the releasing module 660.

If the MSB page in which the write target address is located is the last MSB page in the block, it means that write interference of all pages in the block is eliminated, and therefore all data cache space of the block can be released. According to the cache release rule of the foregoing first obtaining module 640, when data is being written into the last MSB page, data of shared pages of the last n+1 MSB pages in the block remains cached in the preset cache area, where n is a natural number and is at least 1. Therefore, the second obtaining module 650 obtains the addresses of the shared pages (which are LSB pages if the floating-gate transistor stores two bits, or include LSB pages and CSB pages if the floating-gate transistor stores three bits) of the last n+1 MSB pages in the block, and uses the obtained addresses as the data release addresses.

The releasing module 660 is configured to release data that is in the preset cache area and that a cache address having the first mapping relationship with the data release address points to, and delete the data release address from the first mapping relationship.

The releasing module 660 obtains, according to the first mapping relationship, the cache address having the first mapping relationship with the data release address, and releases the data at the cache address. In this way, cache space can be dynamically released while ensuring that data currently subject to severe write interference remains cached. Because the cache space is already released, the data release address and the cache address in the first mapping relationship are deleted.

The saving module 670 is configured to: during power-off, save data that is in the preset cache area 570 in the non-volatile storage space, establish a second mapping relationship between the cache address and a save address that is in the non-volatile storage space, and send the second mapping relationship to the caching module 680.

After the storage device is powered off, the data in the preset cache area 570 is lost. To ensure that the data in the non-volatile storage space can still be correctly read after next power-on, during power-off, the saving module 670 saves the data that is in the preset cache area in the non-volatile storage space, and establishes the second mapping relationship between the cache address that is in the preset cache area and the save address that is in the non-volatile storage space, so that the data previously cached in the preset cache area can correspond to the data saved in the non-volatile storage device.

The caching module 680 is configured to: during power-on, cache, at the cache address in the preset cache area 570 according to the second mapping relationship, the data that the save address in the non-volatile storage space points to.

When powered on again, the caching module 680 obtains the save address that is in the non-volatile storage space and that is in the second mapping relationship, and correspondingly caches the data at the save address at the cache address that has the second mapping relationship with the save address, so as to cache again, according to the original cache address, the data that is cached in the preset cache area before power-off. In this way, when data that is in the non-volatile storage space and that has been cached needs to be read, corresponding cached data can be read according to the first mapping relationship that is previously established, and thereby correct data reading is implemented.

It may be understood that, the data reading apparatus in this application is not limited to including all the modules in this implementation manner. In a different implementation manner, in addition to the modules shown in FIG. 5, the data reading apparatus may further include only the third obtaining module and the allocating module, or further include only the third determining module, the first obtaining module, the second obtaining module, and the releasing module, or further include only the saving module and the caching module, or further include modules of two of the three alternatives.

Figure 7:
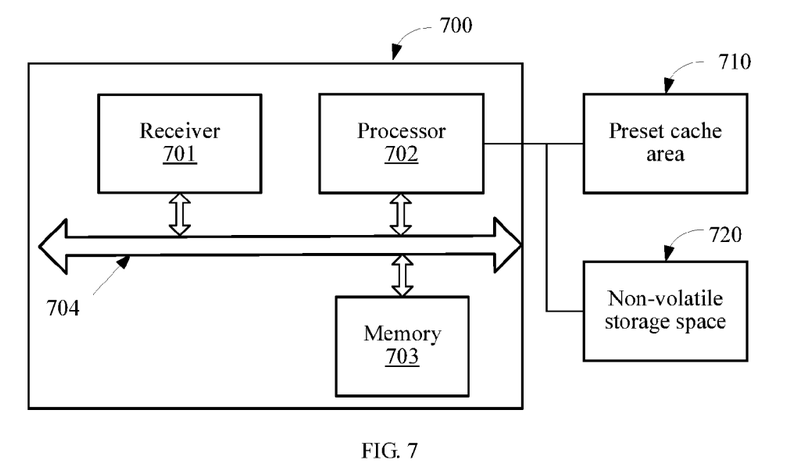
FIG. 7 is a schematic structural diagram of an implementation manner of a controller according to this application.

Referring to FIG. 7, FIG. 7 is a schematic structural diagram of an implementation manner of a controller according to this application. The controller 700 in this implementation manner includes a receiver 701, a processor 702, a memory 703, and a bus 704. The controller 700 is connected to a preset cache area 710 and non-volatile storage space 720.

The receiver 701 is configured to receive a write instruction and a read instruction.

The processor 702 is configured to:
when receiving a read instruction that includes a read target address, determine whether the preset cache area 710 has cached data that the read target address points to; and
when the preset cache area has cached the data that the read target address points to, find a cache address corresponding to the read target address according to a first mapping relationship, and read, from the preset cache area 710, data that the cache address points to, where the first mapping relationship is used to record a correspondence between the target address and the cache address; or when the preset cache area has not cached the data that the read target address points to, read, from the non-volatile storage space 720, the data that the read target address points to.

Optionally, the processor 702 may be further configured to:
- when receiving a write instruction, determine whether a write target address in the write instruction belongs to a most significant bit page MSB page in the non-volatile storage space 720, where the write instruction includes to be written data and the write target address; and
- when it is determined that the write target address does not belong to an MSB page in the non-volatile storage space, store, in the preset cache area 710 and the non-volatile storage space 720 that is corresponding to the write target address, the to be written data, and establish a first mapping relationship between a cache address and the target address; or when it is determined that the write target address belongs to an MSB page in the non-volatile storage space, store, in the non-volatile storage space 720 corresponding to the write target address, the to be written data.

Optionally, the processor 702 is further configured to:
- when the write target address belongs to an MSB page in the non-volatile storage space 720, determine whether the MSB page in which the write target address is located is the last MSB page in a block;
- when the MSB page in which the write target address is located is not the last MSB page in the block, obtain an address of a shared page of the $n^{th}$ MSB page as counted forward from the MSB page in which the write target address is located, and use the obtained address as a data release address, where n is a natural number and is at least 1; or when the MSB page in which the write target address is located is the last MSB page in the block, obtain addresses of shared pages of the last n+1 MSB pages in the block, and use the obtained addresses as the data release addresses, where n is a natural number and is at least 1; and
- release data that is in the preset cache area 710 and that a cache address having the first mapping relationship with the data release address points to, and delete the data release address from the first mapping relationship.

Optionally, the processor 702 is further configured to:
- obtain a maximum page number difference m between an MSB page and an LSB page in all groups of shared pages in the non-volatile storage space 720, where m is a natural number; and
- allocate cache space with a size of at least n*p+m pages for the preset cache area 710, where p represents a quantity of shared pages of an MSB page in the non-volatile storage space 720, and n is a natural number and is at least 1.

Optionally, the processor 702 is further configured to:
- during power-off, save data that is in the preset cache area 710 in the non-volatile storage space 720, and establish a second mapping relationship between the cache address and a save address that is in the non-volatile storage space 720; and
- during power-on, cache, at the cache address in the preset cache area 710 according to the second mapping relationship, the data that the save address in the non-volatile storage space 720 points to.

The memory 703 may include a read-only memory and a random access memory, and provide instructions and data for the processor 702. A part of the memory 703 may further include a non-volatile random access memory (NVRAM). In another implementation manner, the memory 703 may alternatively be located in a same storage medium with the non-volatile storage space 720.

The memory 703 stores the following elements, executable modules or data structures, a subset thereof, or an extension set thereof:
- operating instructions: including various operating instructions used to implement various operations; and
- an operating system: including various system programs, which are used to implement various basic services and process hardware-based tasks.

In an embodiment of the present application, the processor 702 executes the foregoing operations by calling the operating instructions stored in the memory 703 (the operating instructions may be stored in the operating system).

The processor 702 may also be referred to as a central processing unit (CPU)). In a specific application, components of the controller are coupled together by using the bus 704. The bus 704 includes a data bus, and in addition, may further include a power bus, a control bus, a state signal bus, and the like. However, for clarity of description, various buses are marked as the bus 704 in the figure.

The method disclosed in the foregoing embodiments of the present application may be applied to the processor 702, or implemented by the processor 702. The processor 702 may be an integrated circuit chip and has a signal processing capability. In an implementation process, the steps of the foregoing methods may be completed by using a hardware integrated logic circuit of the processor 702 or software instructions. The processor 702 may be a general-purpose processor, a digital signal processor (DSP), an application-specific integrated circuit (ASIC), a field programmable gate array (FPGA) or another programmable logical device, a discrete gate or a transistor logic device, or a discrete hardware component. The methods, steps, and logical block diagrams disclosed in the embodiments of the present application can be implemented or executed. The general-purpose processor may be a microprocessor, or the processor may be any conventional processor or the like. The steps of the methods disclosed in the embodiments of the present application may be directly executed by a hardware decoding processor, or executed by a combination of hardware in a decoding processor and software modules. The software modules may be located in a storage medium mature in the art, such as a random access memory, a flash memory, a read-only memory, a programmable read-only memory, an electrically erasable programmable memory, or a register. The storage medium is located in the memory 703. The processor 702 reads information from the memory 703, and implements the steps of the foregoing methods in combination with the hardware of the processor 702.

In the foregoing solution, data that is in storage space and that is of a page susceptible to a data read error due to write interference is cached in a preset cache area, and when the data of the page is read, the data is selectively read from the cache area, so as to avoid reading data that may contain an error from the storage space. This reduces data read errors caused by write interference, and improves reliability of a storage device.

In the several embodiments provided in this application, it should be understood that the disclosed system, apparatus, and method may be implemented in other manners. For example, the described apparatus embodiment is merely exemplary. For example, the module or unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be indirect couplings or communication connections between interfaces, apparatuses, and units, or may be implemented in electronic, mechanical, or other forms.

The units described as separate parts may or may not be physically separate. Parts displayed as units may or may not be physical units, and may be located in one location, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the implementation manners of this application. The foregoing storage medium includes: any medium that can store program code, such as a universal serial bus (USB) flash drive, a removable hard disk, a read-only memory (ROM), a random access memory (RAM), a magnetic disk, or an optical disc.

What is claimed is:

1. A data accessing method, comprising:
   receiving a write instruction that comprises to be written data and a target address of the to be written data;
   determining whether a storage area indicated by the target address belongs to a most significant bit (MSB) page in a non-volatile storage space; and
   if the storage area does not belong to an MSB page in the non-volatile storage space, storing the to be written data in a preset cache area and the non-volatile storage space, and recording a mapping relationship between a cache address of the to be written data stored in the preset cache area and a storage address of the to be written data stored in the non-volatile storage space to a first mapping relationship; and
   if the storage area belongs to an MSB page in the non-volatile storage space, storing the to be written data in the non-volatile storage space.

2. The method according to claim 1, further comprising:
   obtaining a page number difference between an MSB page and an LSB page of each group of shared pages in the non-volatile storage space, and obtaining a maximum page number difference m from the page number differences of all groups of shared pages, wherein m is a natural number, each group of shared page comprises an MSB page and an LSB page; and
   allocating cache space with a size of at least n*p+m pages for the preset cache area, wherein p represents a quantity of shared pages of an MSB page in each group of shared page, the shared pages are the pages excepting the MSB page in each group of shared page, and n is a natural number and is at least 1.

3. The method according to claim 2, further comprising:
   if the storage area belongs to an MSB page in the non-volatile storage space, determining whether the MSB page in which the storage area is located is the last MSB page in a block;
   if the MSB page in which the storage area is located is not the last MSB page in the block, obtaining an address of a shared page of the $n^{th}$ MSB page as counted forward from the MSB page in which the storage area is located, and using the obtained address as a data release address;
   if the MSB page in which the storage area is located is the last MSB page in the block, obtaining addresses of shared pages of the last n+1 MSB pages in the block, and using the obtained addresses as the data release addresses; and
   releasing data pointed by a corresponding cache address of the data release addresses from the preset cache area according to the first mapping relationship, and deleting the data release address from the first mapping relationship.

4. The method according to claim 1, further comprising:
   during a power-off process, copying data stored in the preset cache area to the non-volatile storage space, and establishing a second mapping relationship between a cache address of the copied data cached in the preset cache area and a stored address of the copied data stored in the non-volatile storage space; and
   during a power-on process, caching the copied data stored in the non-volatile storage space to the preset cache area according to the second mapping relationship.

5. A data accessing apparatus comprising:
   a memory comprising instructions; and
   one or more processors in communication with the memory that execute the instructions to:
      receive a write instruction that comprises to be written data and a target address of the to be written data;
      determine whether a storage area indicated by the target address belongs to a most significant bit (MSB) page in the non-volatile storage space; and
      if the storage area does not belong to an MSB page in the non-volatile storage space, store the to be written data in the preset cache area and the non-volatile storage space, and record a mapping relationship between a cache address of the to be written data stored in the preset cache area and a storage address of the to be written data stored in the non-volatile storage space to the first mapping relationship; and
      if the storage area belongs to an MSB page in the non-volatile storage space, store the to be written data in the non-volatile storage space.

6. The data processing apparatus according to claim 5, wherein the one or more processors execute the instructions to:
   obtain a page number difference between an MSB page and an LSB page of each group of shared pages in the non-volatile storage space, and obtaining a maximum page number difference m from the page number differences of all groups of shared pages, wherein m is a natural number, each group of shared page comprises an MSB page and an LSB page; and
   allocate cache space with a size of at least n*p+m pages for the preset cache area, wherein p represents a quantity of shared pages of an MSB page in each group of shared page, the shared pages are the pages excepting the MSB page in each group of shared page, and n is a natural number and is at least 1.

7. The data processing apparatus according to claim 6, wherein the one or more processors execute the instructions to:
- if the storage area belongs to an MSB page in the non-volatile storage space, determine whether the MSB page in which the storage area is located is the last MSB page in a block;
- if the MSB page in which the storage area is located is not the last MSB page in the block, obtain an address of a shared page of the $n^{th}$ MSB page as counted forward from the MSB page in which the storage area is located, and using the obtained address as a data release address;
- if the MSB page in which the storage area is located is the last MSB page in the block, obtain addresses of shared pages of the last n+1 MSB pages in the block, and use the obtained addresses as the data release addresses; and
- release data pointed by a corresponding cache address of the data release addresses from the preset cache area according to the first mapping relationship, and deleting the data release address from the first mapping relationship.

8. The data processing apparatus according to claim 5, wherein the one or more processors execute the instructions to:
- during a power-off process, copy data stored in the preset cache area to the non-volatile storage space, and establishing a second mapping relationship between a cache address of the copied data cached in the preset cache area and a stored address of the copied data stored in the non-volatile storage space; and
- during a power-on process, cache the copied data stored in the non-volatile storage space to the preset cache area according to the second mapping relationship.

9. A non-transitory computer-readable medium storing computer instructions that when executed by one or more processors cause the one or more processors to perform the steps of:
- receive a write instruction that comprises to be written data and a target address of the to be written data;
- determine whether a storage area indicated by the target address belongs to a most significant bit (MSB) page in a non-volatile storage space; and
- if the storage area does not belong to an MSB page in the non-volatile storage space, store the to be written data in a preset cache area and the non-volatile storage space, and record a mapping relationship between a cache address of the to be written data stored in the preset cache area and a storage address of the to be written data stored in the non-volatile storage space to a first mapping relationship; and
- if the storage area belongs to an MSB page in the non-volatile storage space, store the to be written data in the non-volatile storage space.

10. The computer-readable medium according to claim 9, wherein the one or more processors execute the instructions to:
- obtain a page number difference between an MSB page and an LSB page of each group of shared pages in the non-volatile storage space, and obtaining a maximum page number difference m from the page number differences of all groups of shared pages, wherein m is a natural number, each group of shared page comprises an MSB page and an LSB page; and
- allocate cache space with a size of at least n*p+m pages for the preset cache area, wherein p represents a quantity of shared pages of an MSB page in each group of shared page, the shared pages are the pages excepting the MSB page in each group of shared page, and n is a natural number and is at least 1.

11. The computer-readable medium according to claim 10, wherein the one or more processors execute the instructions to:
- if the storage area belongs to an MSB page in the non-volatile storage space, determine whether the MSB page in which the storage area is located is the last MSB page in a block;
- if the MSB page in which the storage area is located is not the last MSB page in the block, obtain an address of a shared page of the $n^{th}$ MSB page as counted forward from the MSB page in which the storage area is located, and using the obtained address as a data release address;
- if the MSB page in which the storage area is located is the last MSB page in the block, obtain addresses of shared pages of the last n+1 MSB pages in the block, and use the obtained addresses as the data release addresses; and
- release data pointed by a corresponding cache address of the data release addresses from the preset cache area according to the first mapping relationship, and deleting the data release address from the first mapping relationship.

12. The computer-readable medium according to claim 9, wherein the one or more processors execute the instructions to:
- during a power-off process, copy data stored in the preset cache area to the non-volatile storage space, and establishing a second mapping relationship between a cache address of the copied data cached in the preset cache area and a stored address of the copied data stored in the non-volatile storage space; and
- during a power-on process, cache the copied data stored in the non-volatile storage space to the preset cache area according to the second mapping relationship.

* * * * *